United States Patent [19]

Sanderson

[11] 3,922,963

[45] Dec. 2, 1975

[54] FRUIT PRESS

[76] Inventor: Martin I. Sanderson, 132 Grove St., Salinas, Calif. 93901

[22] Filed: June 11, 1974

[21] Appl. No.: 478,297

[52] U.S. Cl. ................................ 100/118; 100/153
[51] Int. Cl.² ........................................... B30B 9/24
[58] Field of Search ........... 100/118, 119, 120, 151, 100/152, 153, 154, 162, 163, 35, 37

[56] References Cited
UNITED STATES PATENTS

| | | | |
|---|---|---|---|
| 3,199,440 | 8/1965 | Banks | 100/153 |
| 3,611,822 | 10/1971 | Sanderson | 74/413 |
| 3,630,158 | 12/1971 | Doornhof | 100/118 |
| 3,800,952 | 4/1974 | Bastgen | 100/118 |

FOREIGN PATENTS OR APPLICATIONS

| 665,528 | 5/1929 | France | 100/152 |
|---|---|---|---|

Primary Examiner—Peter Feldman
Attorney, Agent, or Firm—Theodore J. Bielen, Jr.

[57] ABSTRACT

A conveyor-type fruit press for a continuous compressing of fruit having in series separate compressing stations from which juices from each station can be separately collected, the fruit press has two continuous conveyor webs between which fruit is transported, the stations each have three rollers in pyrimidal juxtaposition with two tandem spaced rollers and one force biased roller arranged substantially therebetween, the two webs being transported around the three rollers in each station in one of two paths for either moderate compression or substantial compression.

8 Claims, 8 Drawing Figures

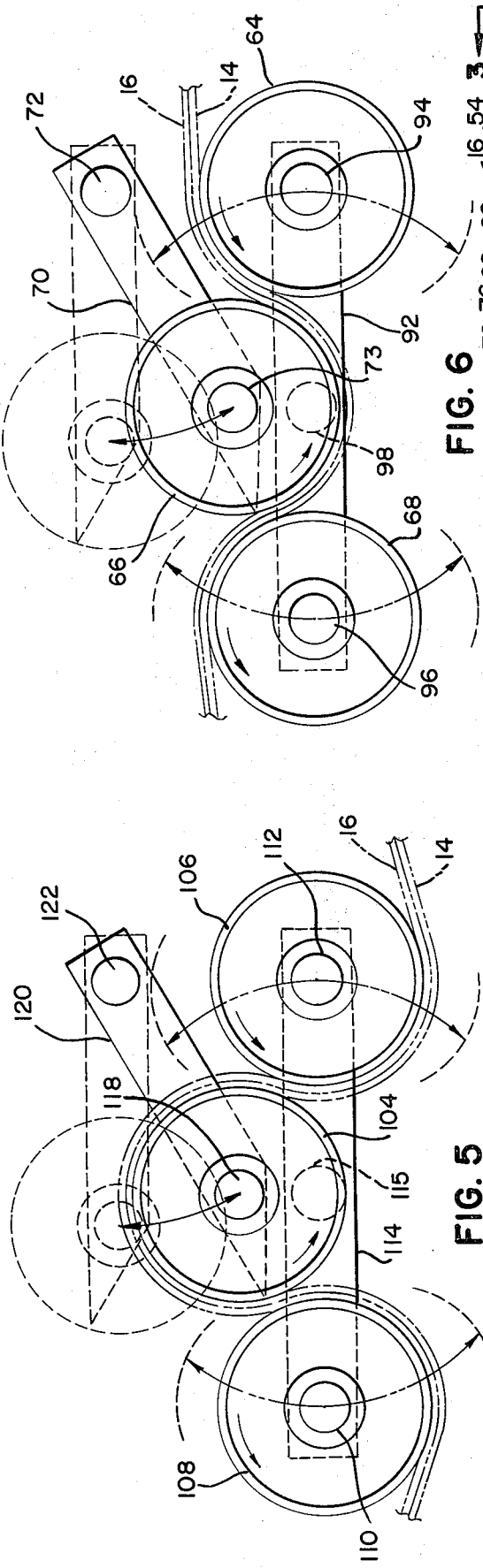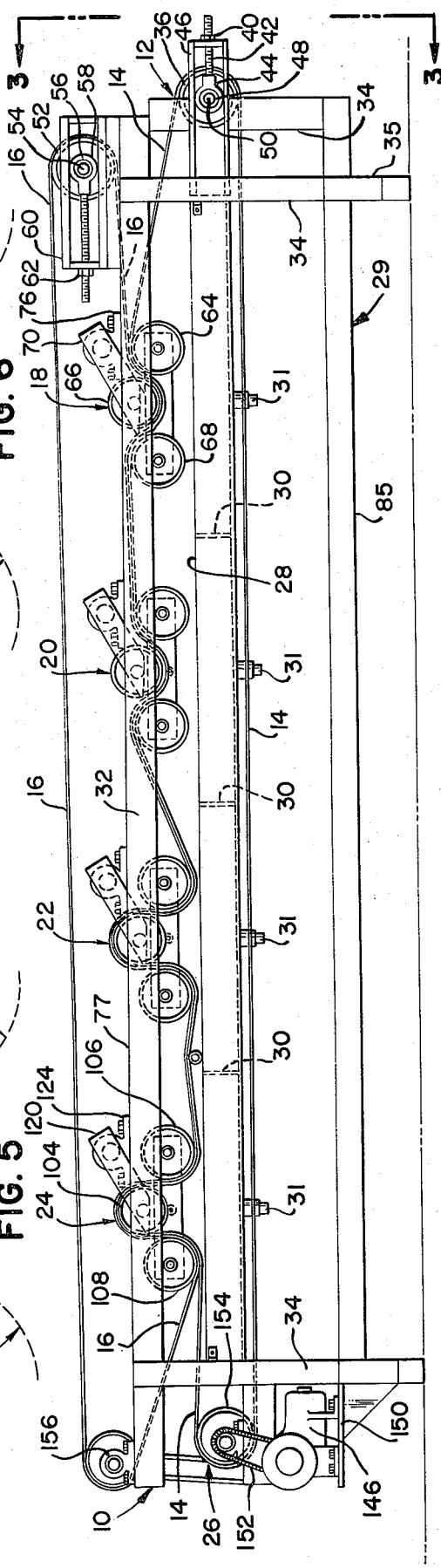

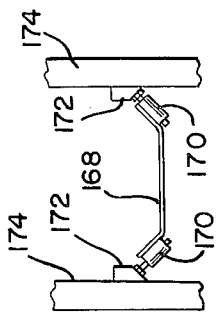
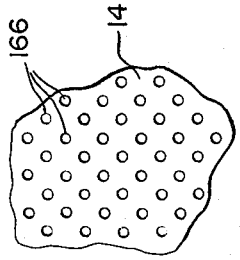
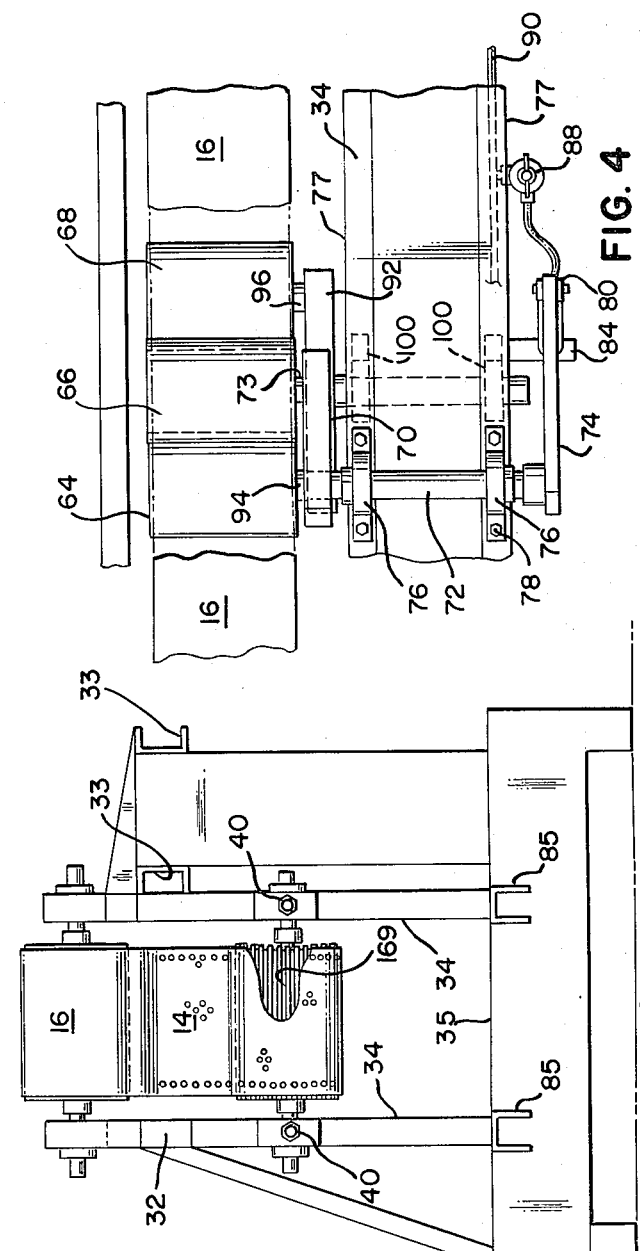
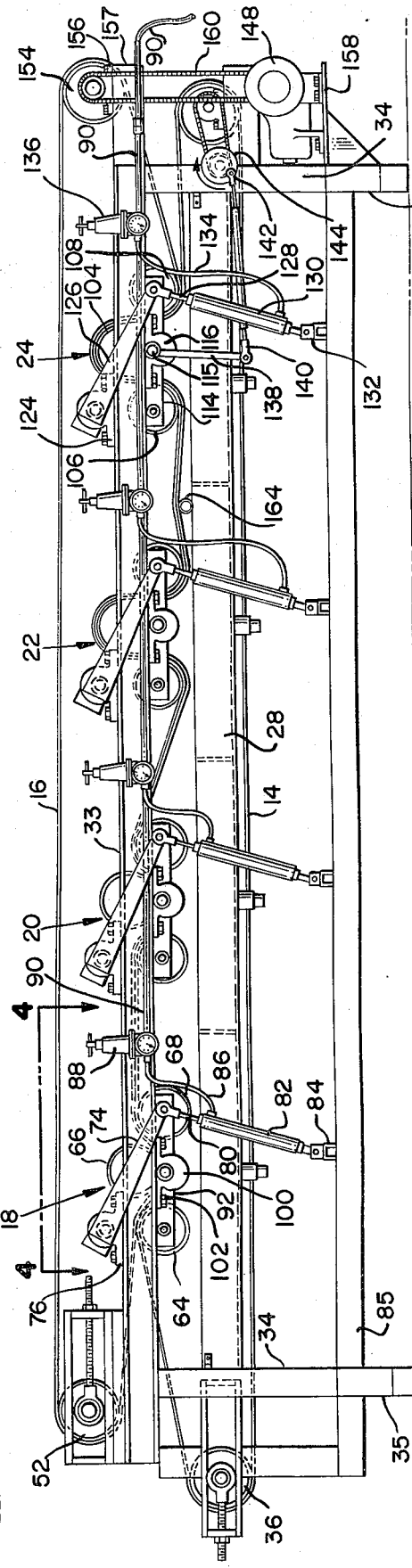

FRUIT PRESS

BACKGROUND OF THE INVENTION

Fruit presses have in the past been of a reciprocating type, a quantity of fruit being pressed by a compressing plate in one or more squeezings. The pulp must then be removed before another quantity of fruit is pressed. Continuous conveyor-type fruit presses have been developed for compressing fruit between porous webs with a plurality of rollers directing the webs in serpentine paths. The arrangement of these devices has generally been such that little control over the squeezings is obtained.

SUMMARY OF THE INVENTION

This invention relates to fruit presses, particularly the conveyor-type which permits continuous pressing of fruits and extraction of their juices. The fruit press of this invention is constructed with a plurality of discrete compressing stations, each of which is separately adjustable as to the pressure of pressing. Furthermore, the separate stations are each constructed with three rollers arranged in pyramidal juxtaposition with two rollers spaced apart in tandem and a third pressure roller arranged substantially therebetween. The arrangement is such that two superimposed conveyor belts transporting fruit between the belts is threaded through each station in one of two paths, one providing a moderate pressing utilizing a less serpentine path and one providing a greater pressing utilizing a more serpentine path. By altering the direction of bias of the center pressure roller, the stations can be adapted to either path.

Additionally, the tension in the belts is automatically adjustable where a drag is encountered; for example, where a larger, localized quantity of fruit attempts to pass between the rollers and a special rocker mechanism in the two tandem rollers is unable to fully accommodate the localized quantity. This tension adjustment mechanism is described in my U.S. Pat., No. 3,611,822, issued on Oct. 1971 and entitled "BELT TIGHTENING MECHANISM."

BRIEF DESCRIPTION OF THE DRAWINGS

FIG. 1 is a front elevational view of the fruit press.

FIG. 2 is a rear elevational view of the fruit press of FIG. 1.

FIG. 3 is a side elevational view of the intake and of the fruit press taken on the lines 3—3 in FIG. 1.

FIG. 4 is a fragmentary top plan view taken on the lines 4—4 in FIG. 2.

FIG. 5 is a schematic side view of a first compressing station in the fruit press of FIG. 1.

FIG. 6 is a schematic side view of a second compressing station in the fruit press of FIG. 1.

FIG. 7 is a side elevational view of a modified embodiment of a portion of the fruit press in FIG. 1.

FIG. 8 is a fragmentary plan view of a conveyor web in the fruit press of FIG. 1.

DETAILED DESCRIPTION OF THE PREFERRED EMBODIMENT

Referring to FIG. 1, the fruit press, designated generally by the reference numeral 10, comprises a conveyor system that continuously crushes grapes or other such fruits to extract juices therefrom. Since the art of crushing grapes for the manufacture of wines is more refined than that for other fruits, the following description will refer principally to the aspects of this invention as a wine press, although other uses certainly are contemplated. In FIG. 1, grapes or the like are continuously supplied to the fruit press 10 at the intake end 12 of the press located at the right of the elongated structure in FIG. 1. The grapes are supplied from an auxiliary hopper (not shown) onto a porous, endless belt or web 14 that constitutes a conveyor continuously feeding into the press 10. This porous lower web 14 converges with an upper web 16 which may also be porous, but is preferably impervious. The two converging webs are superimposed and sandwich the grapes therebetween, conveying the grapes through a series of compressing stations, 18, 20, 22 and 24, of two types as discussed in greater detail hereafter. The number of stations may, however, be varied to suit particular requirements of varying applications.

At each compressing station, 18, 20, 22 and 24, grapes or the like conveyed between the two webs, 14 and 16, are squeezed in a controlled manner to separate the maximum amount of juice from the pulp. Controlled squeezing is particularly important when a press is used for wine grapes, since the grapes should be squeezed without crushing the bitter seeds. The juice, squeezed from the fruit, passes through the porous lower belt 14 and is collected in a trough 28 arranged longitudinally under the conveyor system. The elements of the conveyor system, including the trough, are supported in an overall main frame 29 formed of structural members, some of which are described in greater detail hereafter. The trough 28 is divided into a plurality of separate compartments by dividers 30 such that an individual trough compartment is arranged below each compressing station. In the squeezing of wine grapes, this separation is important since the quality of a wine from a given grape is, in part, dependent on whether the wine is from a first press or a subsequent press. This is certainly understandable since the first juices squeezed from the grape are likely to be the sweetest and juices subsequently forced from the pulp and skins are likely to be more bitter. The four separate compartments formed by the dividers permit selective juices to be obtained through separate outlet connectors 31 from, in essence, four consecutive squeezings. After the grapes have been conveyed through the four compressing stations, the remaining pulp drops from discharge end 26 of the conveyor system. The following detailed description of the elements comprising the fruit press will aid in understanding the operation of the press.

In FIG. 1, the two continuous conveyor belts or webs, 14 and 16, have a substantially common operational path through the compressing stations but have separate return paths. The two webs, 14 and 16, are continuously conveyed through the fruit press 10 guided by a series of rollers mounted to the main frame 29 between an elongated top front rail 32 and a pair of elongated top rear rails 33 supported by vertical end columns 34 carried on a support base 35 at each end of the main frame 29.

For instance, the porous lower web 14 rounds on adjustable roller 36 mounted at one end of the main frame 29. This roller 36 is manually adjustable in order to provide a proper initial operating tension in the web 14. Adjustment is accomplished by turning a nut 40 attached to a threaded arm 42 which is connected to a journal box 44 on each side of the roller 36. The nut 40 and journal box 44 cooperate with a bracket 46, fixed between two segments of the end columns 34 of the main frame 29. The bracket 46 guides the journal box 44 on each side of the roller 36. The journal box 44 encases a bearing 48, which supports the ends of a roller shaft or axel 50 that projects from each end of the roller 36. By turning the nuts 40 (shown also in FIG. 3) which bear against the end of the guide bracket 46, the roller 36 can be linearly moved fore and aft. Minor adjustments in skew tracking of the web 14 are correctable by selective manipulation of one of the nuts 40.

Similarly, the upper web 16 at the intake end 12 of the fruit press 10 rounds an adjustable roller 52 having an axel 54 encased at each end in a bearing 56 and journal box 58. The journal boxes are slidably mounted in guide bracket 60, one mounted on the top front rail 32 and the other against the innermost top rear rail 33. Again, adjustment in the tension in the upper web is accomplished by turning nuts 62 at the ends of threaded arms connected to the journal boxes 58.

The upper web 16 joins with the lower web 14 at the first compressing station 18. The first compressing station 18 comprises three rollers, 64, 66, 68, arranged in a somewhat pyramidal juxtaposition. This arrangement is shown with greater clarity in the enlarged view of FIG. 6. The two converging webs 14 and 16 pass over the first roller 64 in the station, under a second pressure roller 66 and over the third roller 68. The central pressure roller 66 is connected to an arm 70 cantilevered from a rotatable shaft 72 allowing the relative movement as shown in dotted line in FIG. 6. The connection of the central roller 66 to the arm 70 is also accomplished by cantilever, the roller 66 being connected to a projecting axel 74 at only one end, as shown in FIG. 4. With further reference to FIG. 4, the cantilever connection of the arm 70 to one end of the shaft 72 is such that by angularly displacing a connected crank 74 fixed to the other end of the shaft, the roller 66 will be displaced as described above. The shaft 72 is rotatably mounted to the main frame 29 by two journal brackets secured by bolts 78 to the top of the two elongated parallel rails 33 in the main frame 29. The crank 74 is linked to the distal end of a piston rod 80 in a pneumatic piston 82.

The arrangement of crank 74, piston rod 80 and piston 82 is shown with greater clarity in FIG. 2. The pneumatic piston 82 is pivotally attached at one of two structural ends to a bracket 84 mounted to bottom rails 85 in the main frame 34. Connected to the piston 82 is a flexible air hose 86 which supplies air from a pressure regulator 88. The regulator 88 controls the pressure to the pneumatic piston 82 from a master air line 90. The pressure to the piston 82, in turn, controls the pressure that the central roller 66 in the compression station 18 applies against the two webs 14 and 16 sandwiched between the three rollers. In this manner, the compression force squeezing the fruit can be adjusted and controlled to a preselected degree. The use of a pneumatic piston 82 rather than a hydraulic means allows a cushioning effect to be imparted to the squeezing process to accommodate the expected conveyance of fruit in uneven bunches. Other means than pneumatic might be provided. For example, the piston system might be replaced with an adustable compression spring system.

To further provide for a smooth operation of the compressing stations, the two outer rollers 64 and 68 in station 18 are arranged in tandem on a connecting rocker bar 92, as shown in FIGS. 1, 2, 4 and 6. In like fashion with the center roller 66, the two outer rollers 64 and 68 are cantilever mounted to the rocker bar 92 on projecting axels 94 and 96. The rocker bar 92 is pivotally connected to the main frame 29 by a centrally located shaft 98 supported in two journal brackets 100 attached by bolts 102 to the underside of the two parallel top rails 33 in the main frame 29. The connecting rocker bar 92 causes displacements of the central roller 66 to be localized with respect to the outer rollers 64 and 68; i.e., a relative displacement of the central roller from one of the two outer rollers can be effected without necessarily resulting in displacement from the other roller.

In each of the four compressing stations 18, 20, 22, and 24, the apparatus is basically the same as that described above for station 18. The apparatus for each of these stations is mounted on the common top rails 33 and bottom rail 85. Each station is supplied from a main air line to individual pressure regulators for selective control of the compressing force at each station. However, while the sandwiched upper and lower webs, 16 and 14, respectively, are conveyed through stations 18 and 20 as described above in reference to FIG. 6, the webs are conveyed through stations 22 and 24 in the move tortuous manner shown in FIG. 5.

Referring to FIG. 5, the basic arrangement and mounting of the center roller 104 with outer rollers 106 and 108 in station 24 is essentially identical with that described for station 18. The outer rollers 106 and 108 are rotationally carried on axels 110 and 112 projecting from rocker bar 114. As shown in FIG. 2, the rocker bar 114 includes a centrally located shaft 115 carried in two journal brackets 116 (one shown in FIG. 2) mounted to the underside of the two longitudinal top rails 33 in the main frame 29. The center roller 104 is rotationally carried on an axel 118 projecting from the distal end of an arm 120. The arm 120 is connected to a shaft 122 carried in a journal bracket 124 mounted on the two rails 33 as shown in FIGS. 1 and 2.

The opposite end of shaft 122 is connected to a crank 126 which, at its distal end, is connected to the piston rod 128 of a pneumatic piston 130. The piston 130 is mounted at its base end to a bracket 132 on one of the two structural bottom rails 85 in the main frame 29. Air is supplied to the piston by a flexible air hose 134 regulated by a pressure regulator 136 connected to the main air supply line 90.

The arrangement of stations 22 and 24 differ from stations 18 and 20 most noticeably in the path that the sandwiched conveyer webs 14 and 16 take through the rollers. The webs 14 and 16 are conveyed under the first outer roller 106, over the center roller 104 and then under the second outer roller 108. This more tortuous path provides a more severe compression of the fruit sandwiched between the two webs. Unlike stations 18 and 20, exemplified in FIG. 6, where the central roller 66 is downwardly biased by arm 70, powered by the piston driver crank 74 in FIG. 2, the central roller 104 in stations 22 and 24, as exemplified in FIG. 5 by station 24, is upwardly biased against the webs 14 and 16 to effect the proper compression. This is, of course, accomplished by connecting the air hose 134 to the bottom of the piston 130 in the manner shown in FIG. 2. The force on the crank 126 and on the arm 120 connected to the center roller 104 is thus upwardly directed.

While stations 22 and 24 may be identical in construction, an added feature has been included in station 24, the last station before discharge, for the purpose of loosening pulp from the webs for efficient discharge. This feature is a vibrator or a shaker comprising a crank arm 138 attached at one end to the shaft 115 and pivotally connected at the other end to a connecting rod 140. The connecting rod 140 is, in turn, pivotally connected to a pin 142 in the periphery of a rotating flywheel 144. The peripheral pin 142 on the flywheel 144 inparts a rapid reciprocating motion to the end of the connecting rod 140 connected to the crank arm 138. This, in turn, imparts a rapid, short angular reciprocation to the shaft 122 and connected rocker bar 114 in the roller assembly, thus vibrating the webs 14 and 16 and loosening any attached pulp. Although this feature is shown on the last station 24, it may be utilized to advantage on the penultimate station 22 or other stations as well.

In the preferred embodiment, each belt, 14 and 16, is separately driven by individual drive motors, 146 and 148, shown in FIGS. 1 and 2, respectively. Referring first to FIG. 1, the lower web drive motor 146 is mounted on a platform 150 on the end of the main frame 29 and drives, by a connecting chain 152, a drive roller 154 mounted in journal brackets 156 on a rail extension 157 in the main frame 34. The drive roller 154 includes an integral belt tightening mechanism which automatically adjusts the tension in the lower web 14 in accordance with the magnitude of required power transmission therealong. For example, where a large uneven clump of fruit is conveyed to the compressing stations, slippage of the belts over the drive roller 154 might occur because of balking of the portion of the webs containing the large clump at the beginning of a compression station. The belt tightening mechanism senses the strain and tightens the belt pulling the webs through the stations, relaxing when the forces required to convey the webs are reduced. This unique mechanism is described in detail in my U.S. Pat. No. 3,611,822, issued October 1971, entitled "BELT TIGHTENING MECHANISM."

Similarly, referring to FIG. 2, the drive motor 148 for the upper web 16 is mounted on a platform 158 at the end of the main frame 34. Connected by a drive chain 160 is a drive roller 162 which is mounted in journal brackets 164 on the longitudinal top rail and rail extension on each side of the roller 162. The drive roller 162 includes a belt tightening mechanism identical to that of the drive roller for the lower web 14. The belt tightening mechanism for the upper web 16 automatically adjusts the tension in the upper web in the same manner as described above.

The two drive motors operate to concurrently transport the two webs at the same speed such that they wind through the compressing stations in unison. Generally, the serpentine path of the two belts keeps them together. However, where separation might occur; for instance, between the last and next to the last stations, 24 and 22 respectively, a guide 164, as shown in FIG. 2, may be installed to maintain the webs in a sandwiched condition. The return path of the upper web is over the top of the fruit press, as shown in FIGS. 1 and 2. The return path of the lower web is under the trough 28, as shown in FIGS. 1 and 2.

As noted hereinbefore, the lower web 14 is perforated and the upper web preferably imperforate. The perforations of the lower web 14 may comprise a series of small holes 166, as shown in FIG. 8. The holes 166 should generally be small enough to prevent passage of seeds and pulp, although certain amounts that pass can be removed by subsequent straining or settling. The body of the lower web 14 and that of the upper web 16 can be fabricated from a nylon film material of sufficient thickness to possess the strength necessary for the conveyor system.

Generally, the surface of the rollers in the conveyor system are smooth. However, the rollers or selective rollers in the system may have a surface 169 that is uniformly grooved, as shown in the fragmented view of roller 36.

Where necessary for the convenient operation of the system, other features may be incorporated into the basic system described above. For example, as shown in the cross-sectional view of FIG. 7, a lower web 168 depicted therein can be cupped by side guide rollers 170 mounted on brackets 172 on the frame 174 at a point before the lower web converges with the upper web at the intake end of the fruit press. In this manner, the web can more easily receive fruit which might otherwise roll off the conveyor.

From an overview of the fruit press disclosed herein, it is apparent that the system is designed to be versatile. For example, the design of the compressing stations allows a station arranged, as shown in FIG. 5, to be changed to a station, as shown in FIG. 6, merely by changing the air hose position on the pneumatic piston. Changing the arrangement of the belt is facilitated by the cantilever design of the rollers in the compressing stations which are rotatably supported on only one end on cantilevered axles.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A fruit press comprising a conveyor apparatus having two endless conveyor webs arranged superimposed, in part, for compressing fruit therebetween; a plurality of compressing stations having three rollers, each station arranged in pyramidal juxtaposition with two spaced rollers and a third pressure roller positioned substantially therebetween; said two spaced rollers having means for interconnecting said two spaced rollers in tandem, said interconnecting means having means for allowing a tandem rocking of said two interconnected rollers with respect to said third pressure roller; drive means for transporting said webs through said compressing stations; and means for biasing said pressure roller against said webs.

2. The fruit press of claim 1 wherein said means for biasing said pressure roller against said webs includes means for adjusting the degree of bias.

3. The fruit press of claim 2 wherein said means for biasing said pressure roller against said webs comprises a pneumatic piston having linkage means connecting said piston to said pressure roller and a pneumatic pressure adjustment means for selectively adjusting the pressure at each station.

4. A fruit press comprising a conveyor apparatus having two endless conveyor webs arranged superimposed, in part, for compressing fruit therebetween; a plurality of compressing stations having three rollers, each station arranged in pyramidal juxtaposition with two spaced rollers and a third pressure roller positioned substantially therebetween; drive means for transporting said webs through said compressing stations; and means for biasing said pressure roller against said webs, wherein said rollers in said compressing stations are arranged to permit said webs to be selectively transported through said station in one of two paths; a first path being over one of said spaced rollers, under said pressure roller, and over the other of said spaced rollers; and a second path being under one of said spaced rollers, over said pressure roller, and under the other of said spaced rollers.

5. The fruit press of claim 1 wherein one of said webs is porous and the other of said webs is less so and is, in part, superimposed on said porous web.

6. The fruit press of claim 1 wherein said drive means includes an automatic belt tightening mechanism.

7. The fruit press of claim 1 having further individual juice collectors arranged under each compressing station.

8. The fruit press of claim 1 wherein said apparatus includes a mainframe and wherein said means for interconnecting said two spaced rollers in tandem comprises a rocker bar, and, said means for allowing a tandem rocking of said interconnected rollers comprises a pivot device on said rocker bar pivotally connected to said mainframe, said two spaced rollers having axle means for rotatably connecting said rollers to said rocker bar on opposite sides of said pivot device.

* * * * *